US012624139B2

(12) United States Patent
Lin et al.

(10) Patent No.: US 12,624,139 B2
(45) Date of Patent: May 12, 2026

(54) EMULSION POLYMER AND PROCESS FOR PREPARING THE SAME

(71) Applicants: Dow Global Technologies LLC, Midland, MI (US); Rohm and Haas Company, Collegeville, PA (US)

(72) Inventors: Daoshu Lin, Shanghai (CN); Yan Wu, Shanghai (CN); Changkun Piao, Shanghai (CN); Jia Tang, Shanghai (CN); Dong Yun, Shanghai (CN); Hua Ren, Shanghai (CN); Zhenwen Fu, Norristown, PA (US); Baoqing Zheng, Shanghai (CN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 511 days.

(21) Appl. No.: 18/021,046

(22) PCT Filed: Sep. 25, 2020

(86) PCT No.: PCT/CN2020/117695

§ 371 (c)(1),
(2) Date: Feb. 13, 2023

(87) PCT Pub. No.: WO2022/061703

PCT Pub. Date: Mar. 31, 2022

(65) Prior Publication Data

US 2023/0303741 A1 Sep. 28, 2023

(51) Int. Cl.

*C08F 2/30* (2006.01)
*C08F 220/18* (2006.01)
*C09D 133/06* (2006.01)

(52) U.S. Cl.

CPC .... *C08F 220/1804* (2020.02); *C09D 133/064* (2013.01)

(58) Field of Classification Search

CPC .. C08F 220/1804; C08F 220/387; C08F 2/30; C08F 4/40; C08F 212/08; C08F 220/06; C08F 220/14; C09D 133/064; C09D 133/06; C09D 5/022

See application file for complete search history.

(56) References Cited

U.S. PATENT DOCUMENTS

| | | | |
|---|---|---|---|
| 2015/0166474 A1 | 6/2015 | Murata et al. | |
| 2022/0127489 A1 * | 4/2022 | Wang .................. | C09D 133/10 |

FOREIGN PATENT DOCUMENTS

| | | |
|---|---|---|
| JP | 2017014391 | 1/2017 |
| JP | 2017014391 A * | 1/2017 |
| WO | 2017112586 | 6/2017 |
| WO | 2020186447 A1 | 9/2020 |

OTHER PUBLICATIONS

Abbott, "Hansen Solubility Parameters in Practice—Complete with eBook, software and data", 5th Edition.
Brandrup, "Polymer Handbook", 1990, pp. 277-280.
Fox, Bull. Am. Physics Soc., 1956, vol. 1, Issue No. 3, p. 123.

* cited by examiner

*Primary Examiner* — Jiangtian Xu
(74) *Attorney, Agent, or Firm* — CANTOR COLBURN LLP

(57) ABSTRACT

An emulsion polymer comprising: (a) structural units of a specific polymerizable surfactant, (b) structural units of an ethylenically unsaturated anionic monomer, and (c) structural units of an ethylenically unsaturated nonionic monomer; wherein polymer segments of the emulsion polymer that comprise structural units of the ethylenically unsaturated anionic monomer and structural units of the ethylenically unsaturated nonionic monomer together have specific Hansen solubility parameters. An aqueous coating composition comprising such emulsion polymer provides good early water blister resistance.

9 Claims, No Drawings

EMULSION POLYMER AND PROCESS FOR PREPARING THE SAME

FIELD OF THE INVENTION

The present invention relates to an emulsion polymer and a process for preparing the same.

INTRODUCTION

Aqueous or waterborne coating compositions are widely used in industrial coating applications, for example, as exterior topcoats in freight container coatings (FCC). Water resistance, especially early water blister resistance, is typically required for exterior coatings in areas of southern China. After spraying topcoat compositions and drying at 60 to 80 degrees Celsius (° C.) for a period of time, some coated freight containers are dried at warehouse, while others are moved to outdoor for drying in the air. For drying the coated containers outdoor, it requires the resultant topcoats with sufficient early water blister resistance to avoid blisters caused by the rain, as blisters also have negative impacts on appearance and anti-corrosion performance of the coated freight containers.

Therefore, it is desirable to provide a polymer, particularly suitable for coatings, that is capable of providing coatings with early water blister resistance.

SUMMARY OF THE INVENTION

The present invention provides a novel emulsion polymer particularly suitable for coating applications without the aforementioned problems. The emulsion polymer prepared in the presence of a specific polymerizable surfactant comprises polymer segments with specific Hansen solubility parameters. An aqueous coating composition comprising the emulsion polymer of the present invention can provide coatings with excellent early water blister resistance rated as 10, according to the test method described in the Examples section below.

In a first aspect, the present invention is an emulsion polymer comprising:

(a) structural units of a polymerizable surfactant having the structure of formula (I), (I)

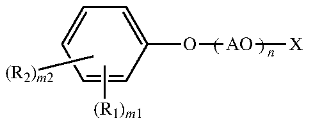

wherein $R_1$ is a phenyl group or

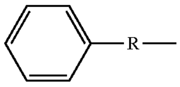

, where R is an alkylene group; m1 is 1, 2, 3 or 4; $R_2$ is an alkyl or a substituted alkyl; m2 is 0 or 1; A represents an alkylene group or a substituted alkylene group, having 2 to 4 carbon atoms; n is an integer in the range of from 1 to 30; and X represents $-(CH_2)_a-SO_3M$ or $-(CH_2)_b-COOM$, where a and b are each independently an integer of from 0 to 4, and M is an aminium ion having one ethylenically unsaturated bond;

(b) structural units of an ethylenically unsaturated anionic monomer; and (c) structural units of an ethylenically unsaturated nonionic monomer;

wherein polymer segments that comprise structural units of the ethylenically unsaturated anionic monomer and polymer segments that comprise structural units of the ethylenically unsaturated nonionic monomer together have the following Hansen solubility parameters:

$$16.42 \leq \delta D \leq 16.64,\ 2.87 \leq \delta P \leq 3.79, \text{ and } 3.94 \leq \delta H \leq 4.57.$$

In a second aspect, the present invention is a process of preparing the emulsion polymer of the first aspect. The process comprises: emulsion polymerization of a monomer mixture comprising an ethylenically unsaturated anionic monomer and an ethylenically unsaturated nonionic monomer in the presence of a polymerizable surfactant, wherein the polymerizable surfactant has the structure of formula (I), (I)

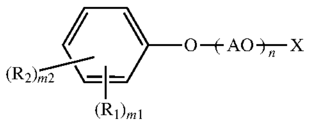

wherein $R_1$ is a phenyl group or

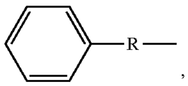

, where R is an alkylene group; m1 is 1, 2, 3 or 4; $R_2$ is an alkyl or a substituted alkyl; m2 is 0 or 1; A represents an alkylene group or a substituted alkylene group, having 2 to 4 carbon atoms; n is an integer in the range of from 1 to 30; and X represents $-(CH_2)_a-SO_3M$ or $-(CH_2)_b-COOM$, where a and b are each independently an integer of from 0 to 4, and M is an aminium ion having one ethylenically unsaturated bond;

wherein polymer segments that comprise structural units of the ethylenically unsaturated anionic monomer and polymer segments that comprise structural units of the ethylenically unsaturated nonionic monomer together have the following Hansen solubility parameters:

$$16.42 \leq \delta D \leq 16.64,\ 2.87 \leq \delta P \leq 3.79, \text{ and } 3.94 \leq \delta H \leq 4.57.$$

In a third aspect, the present invention is an aqueous coating composition comprising the emulsion polymer of the first aspect.

DETAILED DESCRIPTION OF THE INVENTION

"Aqueous" dispersion or composition herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Acrylic" as used herein includes (meth)acrylic acid, alkyl (meth)acrylate, (meth)acrylamide, (meth)acrylonitrile and their modified forms such as hydroxyalkyl (meth) acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

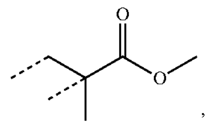

where the dotted lines represent the points of attachment of the structural unit to the polymer backbone.

"Glass transition temperature" or "$T_g$" reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Hansen solubility parameters" as used herein are illustrated by δD, δP, and δH, where δD stands for dispersion (related to van der Waals force), δP stands for polarity (related to dipole moment), and δH stands for hydrogen bonding.

The emulsion polymer of the present invention may be prepared by polymerization of a monomer mixture in the presence of a polymerizable surfactant. The emulsion polymer comprises (a) structural units of one or more polymerizable surfactant. The polymerizable surfactant may have the structure of formula (I),

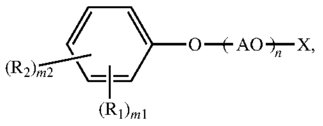
(I)

wherein $R_1$ is a phenyl group or

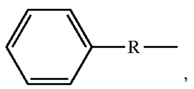

where R is an alkylene group; m1 is 1, 2, 3 or 4; $R_2$ is an alkyl or a substituted alkyl; m2 is 0 or 1; A represents an alkylene group or a substituted alkylene group, having 2 to 4 carbon atoms; n is an integer in the range of from 1 to 30; and X represents $-(CH_2)_a-SO_3M$ or $-(CH_2)_b-COOM$, where a and b are each independently an integer of from 0 to 4, and M is an aminium ion having one ethylenically unsaturated bond.

In formula (I), R can be an alkylene group having from 1 to 4 carbon atoms, preferably having from 2 to 3 carbon atoms, such as for example, $-CH_2-$, $-CH(CH_3)-$, or $-C(CH_3)_2-$.

Preferred $R_1$ is

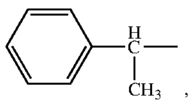

Preferably, m1 is 2 or 3.

In formula (I), A can be an ethylene group ($-CH_2CH_2-$). The value of n can be an integer ranging from 2 to 20 or from 5 to 20.

In formula (I), preferred X is $-SO_3M$. Preferably, M is

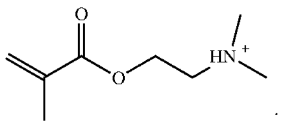

The polymerizable surfactant useful in the present invention is typically an amphoteric surfactant. "Amphoteric surfactant", also known as "zwitterionic surfactant", refers to a surfactant bearing both acidic and basic functionalities and is well known in the art, for example, Amphoteric Surfactants, ed. B. R. Bluestein and C. L. Hilton, Surfactant Series Vol. 12 Marcel Dekker NY, NY (1982). Amphoteric surfactants may include those having an isoelectric point at pH=3 to pH=8. The isoelectric point occurs at a characteristic pH for each amphoteric surfactant, and is that pH at which the negative charge on the surfactant molecule is exactly balanced by the positive charge on that same molecule. The amphoteric surfactants may include those having acidic functionality, especially sulfonated functionality. Sulfonated moieties may be present in fully protonated (sulfoacid) form, as salts with at least one type of cation, or as mixtures of protonated and salt forms. The sulfoacid moieties may also be part of inner salts. As used herein, inner salt refers to a molecule bearing an anionically charged moiety, the counter ion (i.e., cation) for which is also a moiety attached to the that same molecule.

Specific examples of the polymerizable surfactants useful in the present invention include the following structure:

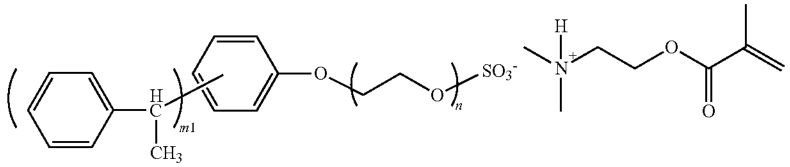

, where m1 is 2 or 3 and n is as defined above.

The emulsion polymer of the present invention may comprise, by weight based on the weight of the emulsion polymer, structural units of the polymerizable surfactant in an amount of 0.5% or more, 0.6% or more, 0.7% or more, 0.8% or more, 0.9% or more, or even 1% or more, and at the same time, 5% or less, 4% or less, 3% or less, 2% or less, or even 1.5% or less. “Weight of the emulsion polymer” in the present invention refers to the dry weight of the emulsion polymer.

The emulsion polymer of the present invention may comprise (b) structural units of one or more ethylenically unsaturated anionic monomer (that is different from the polymerizable surfactant). The term “anionic monomer” herein refers to a monomer that bears an anionic charge between pH=1-14. The anionically charged moiety of the anionic monomer typically contains one ethylenically unsaturated bond. Examples of suitable ethylenically unsaturated anionic monomers include α,β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; sodium styrene sulfonate (SSS), sodium vinyl sulfonate (SVS), 2-acrylamido-2-methylpropanesulfonic acid (AMPS), sodium salt of 2-acrylamido-2-methyl-1-propanesulfonic acid, ammonium salt of 2-acrylamido-2-methyl-1-propane sulfonic acid; sodium salt of allyl ether sulfonate; phosphoalkyl (meth)acrylates such as phosphoethyl (meth)acrylate, phosphopropyl (meth)acrylate, phosphobutyl (meth)acrylate, salts thereof, and mixtures thereof; $CH_2{=}C(R_{p1})—C(O—O—(R_{p2}O)_p—P(O)(OH)_2$, wherein $R_{p1}{=}H$ or $CH_3$, $R_{p2}$=alkyl and p=1-10, such as SIPOMER PAM-100, SIPOMER PAM-200, and SIPOMER PAM-300 all available from Solvay; phosphoalkoxy (meth)acrylates such as phospho ethylene glycol (meth)acrylate, phospho diethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, allyl ether phosphate, vinyl phosphonic acid, salts thereof, or mixtures thereof. Preferred ethylenically unsaturated anionic monomers are phosphoethyl methacrylate (PEM), acrylic acid (AA), methacrylic acid (MAA), or mixtures thereof. The emulsion polymer of the present invention may comprise, by weight based on the weight of the emulsion polymer, 0.1% or more, 0.3% or more, 0.5% or more, 0.75% or more, or even 1% or more, and at the same time, 8% or less, 7% or less, 6% or less, 5% or less, 4.5% or less, 4% or less, 3.8% or less, 3.5% or less, or even 3.3% or less of structural units of the ethylenically unsaturated anionic monomer.

The emulsion polymer of the present invention may comprise (c) structural units of one or more ethylenically unsaturated nonionic monomer (that is different from the polymerizable surfactant), which can be a monoethylenically or multiethylenically unsaturated monomer. The term “nonionic monomer” herein refers to a monomer that does not bear an ionic charge between pH=1-14. Suitable monoethylenically unsaturated nonionic monomers may include, for example, vinyl aromatic monomers, $C_1$-$C_{20}$-alkyl (meth) acrylates, acrylonitrile (AN), (meth)acrylamide, or mixtures thereof. The $C_1$-$C_{20}$-alkyl (meth)acrylates refer to alkyl esters of (meth)acrylic acid containing an alkyl with from 1 to 20 carbon atoms. The $C_1$-$C_{20}$-alkyl (meth)acrylates may include $C_1$-$C_3$-alkyl (meth)acrylates, cycloalkyl (meth)acrylates, and $C_4$-$C_{20}$-alkyl (meth)acrylates that are different from the cycloalkyl (meth)acrylate. Examples of suitable alkyl (meth)acrylates include methyl (meth)acrylate, ethyl (meth)acrylate, butyl (meth)acrylate, iso-butyl (meth)acrylate, 2-ethylhexyl (meth)acrylate, lauryl (meth)acrylate, stearyl (meth)acrylate; cycloalkyl (meth)acrylates such as cyclohexyl (meth)acrylate, methcyclohexyl (meth)acrylate, dihydrodicyclopentadienyl (meth)acrylate, trimethylcyclohexyl (meth)acrylate, and t-butyl (meth)cyclohexyl acrylate; hydroxy-functional (meth)acrylic acid alkyl ester such as hydroxyethyl methacrylate and hydroxypropyl methacrylate; glycidyl (meth)acrylate; or mixtures thereof. The vinyl aromatic monomer may include styrene, substituted styrene such as alpha-methylstyrene, trans-beta-methylstyrene, 2,4-dimethylstyrene, ethylstyrene, butylstryene, and p-methoxy styrene; o-, m-, and p-methoxystyrene; and p-trifluoromethylstyrene; or mixtures thereof. Preferred monoethylenically unsaturated nonionic monomers include methyl methacrylate, styrene, cyclohexyl methacrylate, 2-ethylhexyl acrylate, butyl acrylate, or mixtures thereof. The content of structural units of the ethylenically unsaturated nonionic monomer may be adjusted to give the resultant emulsion polymer with desired Hansen solubility parameters. For example, the emulsion polymer may comprise, by weight based on the weight of the emulsion polymer, structural units of butyl acrylate preferably in an amount of 35% or more, 36% or more, or even 37% or more, and at the same time, 45% or less, 44% or less, or even 43% or less; and structural units of styrene in an amount of 30% or more, 31% or more, 32% or more, 33% or more, or even 34% or more, and the same time, 50% or less, 49% or less, 48% or less, 46% or less, or even 45% or less. Alternatively, the emulsion polymer may comprise, by weight based on the weight of the emulsion polymer, structural units of 2-ethylhexyl acrylate preferably in an amount of 30% or more, 31% or more, or even 32% or more, and at the same time, 40% or less, 39% or less, or even 38% or less; and structural units of styrene in an amount of 30% or more, 31% or more, 32% or more, 33% or more, or even 34% or more, and at the same time, 39.5% or less, 39% or less, 38% or less, or even 37% or less. The emulsion polymer may comprise, by weight based on the weight of the emulsion polymer, less than 19% of structural units of acrylonitrile, for example, less than 15%, less than 10%, less than 5%, less than 1%, or even zero of structural units of acrylonitrile. Multiethylenically unsaturated nonionic monomers useful in the present invention include di-, tri-, tetra-, or higher multifunctional ethylenically unsaturated monomers. Suitable multiethylenically unsaturated monomers may include, for example, allyl (meth)acrylate, divinyl benzene, ethylene glycol dimethacrylate, butylene glycol dimethacrylate, or mixtures thereof. The emulsion polymer may comprise, by weight based on the weight of the emulsion polymer, from zero to 3.0%, from 0.05% to 0.8%, or from 0.1% to 0.5% of structural units of the multiethylenically unsaturated nonionic monomer.

The emulsion polymer of the present invention comprises a plurality of polymer segments derived from the monomers above by polymerization, for example, the emulsion polymer comprises segments derived from the polymerizable surfactant, polymer segments derived from the ethylenically unsaturated anionic monomer, and polymer segments derived from the ethylenically unsaturated nonionic monomer. Each polymer segment contains one or more structural units of a monomer. Among these, polymer segments comprising (b) structural units of the ethylenically unsaturated anionic monomer and polymer segments comprising (c) structural units of the ethylenically unsaturated nonionic monomer (that is, all segments that are either derived from the ethylenically unsaturated anionic monomer or derived from the ethylenically unsaturated nonionic monomer) together demonstrate the following Hansen solubility parameters:

$$16.42 \leq \delta D \leq 16.64,\ 2.87 \leq \delta P \leq 3.79,\ \text{and}\ 3.94 \leq \delta H \leq 4.57.$$

Hansen solubility parameters of polymer segments reported herein are those calculated using the equations below. For calculating the Hansen solubility parameters of specific polymer segments that comprise structural units of monomers (i.e., polymer segments derived from monomers by polymerization), the following equations are used:

$$\delta D(calc.) = \sum_{k=1}^{n} \delta D(M_k) * w(M_k);$$

$$\delta P(calc.) = \sum_{k=1}^{n} \delta P(M_k) * w(M_k);$$

$$\delta H(calc.) = \sum_{k=1}^{n} \delta H(M_k) * w(M_k);$$

wherein δD(calc.), δP(calc.), and δH(calc.) are the calculated Hansen solubility parameters for the polymer segments, $w(M_k)$ is the weight fraction of monomer $M_k$ in the polymer segments, $\delta D(M_k)$, $\delta P(M_k)$, and $\delta H(M_k)$ are the Hansen solubility parameters for monomer $M_k$, and n is the number of monomers in the polymer segments (herein n refers to the number of all anionic and nonionic monomers). Polymer segments comprising structural units (b) and structural units (c) herein are typically those excluding segments comprising structural units of the polymerizable surfactant in the emulsion polymer. The Hansen solubility parameters of the monomers can be obtained by using HSPiP software and database (https://www.hansen-solubility.com/HSPiP/) or be referenced to "Hansen Solubility Parameters in Practice—Complete with eBook, software and data", $5^{th}$ Edition, edited by Steven Abbott, Charles M. Hansen and Hiroshi Yamamoto, published by Hansen-Solubility.com. If the Hansen solubility parameters for a monomer is not available in the HSPiP database, the functional-group-contribution-based 'Y-MB' method (https://pirika.com/NewHP/Y-MB/Y-MB.html) in the HSPiP software can be used to calculate the Hansen solubility parameters for such monomer.

The Hansen solubility parameters of some commonly used ethylenically unsaturated anionic or nonionic monomers are listed below:

| Monomer | δD | δP | δH |
|---|---|---|---|
| Butyl acrylate (BA) | 15.7 | 5.5 | 5.9 |
| Styrene (ST) | 17.8 | 0.6 | 1.4 |
| Methyl methacrylate (MMA) | 15.55 | 5.09 | 6.13 |
| Methacrylic acid (MAA) | 15.7 | 5.4 | 10.5 |
| Acrylonitrile (AN) | 15.3 | 14.3 | 5.5 |
| 2-ethylhexyl acrylate (EHA) | 15.8 | 3 | 4.1 |
| Hydroxyethyl methacrylate (HEMA) | 16.4 | 7.2 | 11.3 |
| Allyl methacrylate (ALMA) | 15.8 | 4.1 | 5 |
| Acrylic acid (AA) | 14.7 | 5.3 | 12.4 |
| Glycidyl methacrylate (GMA) | 16.7 | 6.6 | 6.6 |
| Cyclohexyl methacrylate (CHMA) | 16.56 | 3.12 | 4.08 |
| Lauryl methacrylate (LMA) | 14.4 | 2.2 | 5.1 |

Surprisingly, the emulsion polymer comprising the combination of structural units of the polymerizable surfactant with structural units of (b) and (c) that afford polymer segments comprising thereof with the Hansen solubility parameters above can provide coatings comprising such emulsion polymer with excellent early water blister resistance rated as 10, according to the test method described in the Examples section below.

The emulsion polymer of the present invention may comprise structural units of the polymerizable surfactant, structural units of the ethylenically unsaturated anionic monomer, structural units of styrene, and structural units of the alkyl (meth)acrylate. For example, the emulsion polymer comprises, by weight based on the weight of the emulsion polymer, structural units of the polymerizable surfactant, preferably having the structure of

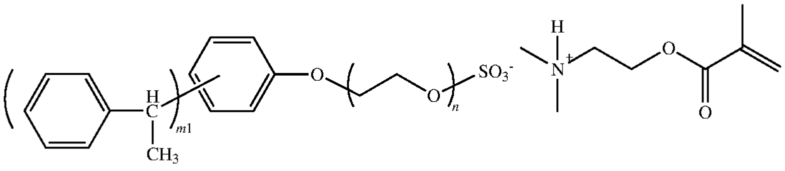

, where m1 and n are as defined above, structural units of the ethylenically unsaturated anionic monomer, from 30% to 50% of structural units of styrene, from 35% to 45% of structural units of butyl acrylate, and structural units of cyclohexyl methacrylate, methyl methacrylate, or mixtures thereof.

Alternatively, the emulsion polymer comprises, by weight based on the weight of the emulsion polymer, structural units of the polymerizable surfactant, preferably having the structure of

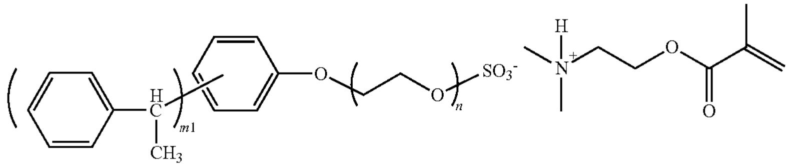

, where m1 and n are as defined above, structural units of the ethylenically unsaturated anionic monomer, from 30% to 39.5% of structural units of styrene, from 30% to 40% of structural units of 2-ethylhexyl acrylate, and structural units of cyclohexyl methacrylate, methyl methacrylate, or mixtures thereof.

Total concentration of structural units in the emulsion polymer is equal to 100%. Types and levels of the monomers described above may be chosen to provide the emulsion polymer with a glass transition temperature ($T_g$) suitable for different applications. The emulsion polymer may have a $T_g$ in the range of from 0 to 60° C., from 10 to 50° C., from 15 to 45° C., or from 20 to 40° C. The $T_g$ values of the emulsion polymer can be measured by various techniques including differential scanning calorimetry (DSC) or calculated by using the Fox equation.

The emulsion polymer of the present invention is typically present in an aqueous dispersion, in which emulsion polymer particles may have an average particle size of from 50 nanometers (nm) to 500 nm, from 80 nm to 400 nm, or from 90 nm to 300 nm. The particle size herein refers to Z-average size and may be measured by a Brookhaven BI-90 Plus Particle Size Analyzer. The aqueous dispersion comprising the emulsion polymer may further comprise water. The concentration of water may be, by weight based on the total weight of the aqueous dispersion, in the range of from 30% to 90% or from 40% to 80%.

The emulsion polymer of the present invention may be prepared by emulsion polymerization of a monomer mixture comprising the ethylenically unsaturated anionic monomer and the ethylenically unsaturated nonionic monomer in the presence of the polymerizable surfactant. Total concentration of monomers including the polymerizable surfactant for preparing the emulsion polymer is equal to 100%. A mixture of the monomers for preparing the emulsion polymer may be added neat or as an emulsion in water; or added in one or more additions or continuously, linearly or nonlinearly, over the reaction period of preparing the emulsion polymer, or combinations thereof. Temperature suitable for emulsion polymerization processes may be lower than 100° C., in the range of from 30 to 95° C., or in the range of from 50 to 90° C.

In the process of preparing the emulsion polymer, free radical initiators may be used in each stage. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers used for preparing the emulsion polymer. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Chelating agents for the metals may optionally be used.

In the process of preparing the emulsion polymer, the polymerizable surfactant is used. The polymerizable surfactant may be added prior to or during the polymerization of the monomers, or combinations thereof. A portion of the polymerizable surfactant can also be added after the polymerization. The polymerizable surfactants may be used in an amount of from 0.5% to 5%, from 0.6% to 4%, from 0.7% to 3%, from 0.8% to 2%, or from 1% to 1.5%, by weight based on the total weight of monomers used for preparing the emulsion polymer. "Monomers used for preparing the emulsion polymer" herein include the polymerizable surfactant.

Preferably, the process of preparing the emulsion polymer is conducted substantially free of an additional surfactant that is different from the polymerizable surfactant. Additional surfactants may include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. "Substantially free" refers to less than 0.8% of the additional surfactant, preferably, less than 0.6%, less than 0.5%, less than 0.1%, or even zero, by weight based on the total weight of monomers used for preparing the emulsion polymer.

In the process of preparing the emulsion polymer, a chain transfer agent may be used. Examples of suitable chain transfer agents include 3-mercaptopropionic acid, methyl mercaptopropionate, butyl mercaptopropionate, n-dodecyl mercaptan, benzenethiol, azelaic alkyl mercaptan, or mixtures thereof. The chain transfer agent may be used in an effective amount to control the molecular weight of the emulsion polymer. The chain transfer agent may be present in an amount of from zero to 3%, from 0.01% to 1%, or from 0.1% to 0.3%, by weight based on the total weight of monomers used for preparing the emulsion polymer.

The pH value of the obtained aqueous emulsion polymer dispersion may be controlled to be at least 5, for example, from 6 to 10 or from 6.5 to 9, by neutralization. Neutralization may be conducted by adding one or more bases which may lead to partial or complete neutralization of the ionic or latently ionic groups of the multistage polymeric particles. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The emulsion polymer of the present invention is useful in many applications including, for example, wood coatings, metal protective coatings, architecture coatings, and traffic paints. The present invention also relates to an aqueous coating composition comprising the emulsion polymer. The emulsion polymer may be present, by weight based on the weight of the aqueous coating composition, in an amount of from 10% to 80%, from 20% to 70%, or from 30% to 60%.

The aqueous coating composition of the present invention may comprise one or more pigment. As used herein, the term "pigment" refers to a particulate inorganic material which is capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. The aqueous coating composition may comprise one or more extender. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 5% to 70%, from 10% to 60%, or from 15% to 40%. PVC of a coating composition may be determined according to the equation:

$$PVC=[Volume_{(Pigment+Extender)}/Volume_{(Pigment+Extender+Emulsion\ polymer)}]\times 100\%.$$

The aqueous coating composition of the present invention may comprise one or more matting agent. "Matting agent" herein refer to any inorganic or organic particle that provides matt effect. Matting agents usually have an average particle size of 5.5 microns or more according to ASTM E2651-10. The matting agents may be selected from silica matting agents, polyurea matting agents, polyacrylate, polyethylene, polytetrafluoroethylene, or mixtures thereof. The matting agent may be present, by weight based on the total weight of the aqueous coating composition, in an amount of from zero to 10%, from 0.1% to 7.5%, or from 0.5% to 5%.

The aqueous coating composition of the present invention may comprise one or more defoamer. "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. The defoamer may be present, by weight based on the total weight of the aqueous coating composition, in an amount of from zero to 2%, from 0.001% to 1.5%, or from 0.01% to 1%.

The aqueous coating composition of the present invention may comprise one or more thickener (also known as "rheology modifier"). The thickener may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferred thickener is based on HEUR. The thickener may be present, by weight based on the total weight of the aqueous coating composition, in an amount of from zero to 3%, from 0.05% to 2%, or from 0.1% to 1%.

The aqueous coating composition of the present invention may comprise one or more wetting agent. "Wetting agent" herein refer to a chemical additive that reduces the surface tension of a coating composition, causing the aqueous coating composition to more easily spread across or penetrate the surface of a substrate. Wetting agents may be polycarboxylates, anionic, zwitterionic, or non-ionic. The wetting agent may be present, by weight based on the total weight of the aqueous coating composition, in an amount of from zero to 3%, from 0.05% to 2%, or from 0.1% to 1%.

The aqueous coating composition of the present invention may comprise one or more coalescent. "Coalescent" herein refer to a slow-evaporating solvent that fuses polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, Texanol ester alcohol, or mixtures thereof. Preferred coalescents include Texanol ester alcohol, dipropylene glycol n-butyl ether, ethylene glycol monobutyl ether, diethylene glycol monobutyl ether, n-butyl ether, or mixtures thereof. The coalescent may be present, by weight based on the total weight of the aqueous coating composition, in an amount of from zero to 8%, from 0.5% to 6%, or from 1% to 5%.

The aqueous coating composition of the present invention may further comprise water, for example, in an amount of from 30% to 90%, from 40% to 85%, or from 50% to 80%, by weight based on the total weight of the aqueous coating composition.

In addition to the components described above, the aqueous coating composition of the present invention may further comprise any one or combination of the following additives: buffers, neutralizers, dispersants, humectants, biocides, anti-skinning agents, colorants, flowing agents, anti-oxidants, plasticizers, freeze/thaw additives, leveling agents, thixotropic agents, adhesion promoters, anti-scratch additives, and grind vehicles. These additives may be present in a combined amount of, from zero to 5%, from 0.001% to 3%, or from 0.01% to 2%, by weight based on the total weight of the aqueous coating composition.

The aqueous coating composition of the present invention may be prepared with techniques known in the coating art, including admixing the emulsion polymer with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the aqueous coating composition may be dried, or be allowed to dry, at temperatures of from 5 to 30° C. for 7 days or more. Alternatively, the aqueous coating composition may be dried at temperatures of from 5 to 30° C. for 5 to 30 minutes, and then dried at an elevated temperature, for example, from higher than 40 to 80° C., for 20 to 180 minutes, followed by further drying at temperatures of from 5 to 30° C., thus to form a film (i.e., coating). The aqueous coating composition of the present invention can provide coating films obtained therefrom, i.e., the coatings after drying the aqueous coating composition applied to a substrate, with excellent early water blister resistance rated as 10 according to the test method described in the Examples section.

The aqueous coating composition of the present invention can be applied to, and adhered to, various substrates. Examples of suitable substrates include concrete, cementious substrates, wood, metals, stones, elastomeric substrates, glass or fabrics. The aqueous coating composition is suitable for various coating applications, such as architecture coatings, marine and protective coatings, automotive coatings, wood coatings, coil coatings, and civil engineering coatings. The aqueous coating composition can be used alone, or used as a topcoat in combination with other coatings to form multi-layer coatings. For example, the multi-layer coating can be a two-layer coating comprising a two-component epoxy coating as a base coat and the aqueous coating composition as a topcoat. The multi-layer coating can also be in a three-layer coating comprising a Zinc-containing coating as a primer, a two-component epoxy coating as a midcoat, and the aqueous coating composition as a topcoat.

EXAMPLES

Some embodiments of the invention will now be described in the following Examples, wherein all parts and percentages are by weight unless otherwise specified.

Methyl methacrylate (MMA), butyl acrylate (BA), 2-ethylhexyl acrylate (EHA), acrylonitrile (AN), and styrene (ST) are available from Langyuan Chemical Co., Ltd.

Cyclohexyl methacrylate (CHMA) is available from BASF.

Methacrylic acid (MAA), tert-butyl hydroperoxide (t-BHP), isoascorbic acid (IAA), and ammonium persulfate (APS) are all available from Sinopharm Chemical Reagent Co., Ltd.

AMINOION RE1000 ("RE1000") surfactant (active content: 30%), available from Nippon Nyukazai Co., Ltd., is a reactive zwitterionic phenol ethoxylate surfactant.

HITENOL AR-1025 ("AR-1025") surfactant (active content: 25%), available from Daiichi Kogyo Seiyaku Co., Ltd., is a polymerizable alkoxylated tristyrylphenol sulfonate surfactant.

REASOAP SR-1025 ("SR-1025") surfactant (active content: 25%), available from Adeka Co., Ltd., is a polymerizable alkoxylated sulfonate surfactant.

SOPROPHOR WA 1802 ("WA 1802") non-reactive surfactant (active content: 31%), available from Solvay, is an ammonia alkoxylated tristyrylphenol sulfonate.

RHODAFAC RS-610 ("RS-610") non-reactive surfactant (active content: 25%), available from Solvay, is a branched alcohol ethoxylate based phosphate.

DISPONIL FES 32 ("Fes-32") non-reactive surfactant (active content: 30%), available from BASF, is an alkoxylated sulfonate surfactant.

TRITON™ XN-45S ("XN-45S") non-reactive surfactant (active content: 60%), available from The Dow Chemical Company, is an alkoxylated sulfonate octylphenol surfactant (TRITON is a trademark of The Dow Chemical Company).

The following standard analytical equipment and methods are used in the Examples and in determining the properties and characteristics stated herein:

Early Water Blister Resistance Test

The early water blister resistance test was conducted according to ASTM D714-02 method (Standard test method for evaluating degree of blistering of paints). Coating composition samples were drawn down on Q-Panels (Iron phosphate, R-46) with a wet film thickness of 100 μm. After flash drying at room temperature for 10 minutes (min), these panels were placed into an oven at 75° C. for 30 min, and then dried at room temperature for 45 min. The obtained coated panels were immersed into deionized (DI) water for 7 days, and then observed for surface changes and rated based on the size and area of water blister:

Size-reference standards have been selected for four steps as to size on a numerical scale from 10 to 0, in which No. 10 represents no blistering, No. 8 represents the smallest size blister easily seen by the unaided eye, and Nos. 6, 4, and 2 represent progressively larger sizes.

Frequency-reference standards have been selected for four steps in frequency at each step in size, designated as: Dense ("D"), Medium dense ("MD"), Medium ("M"), and Few ("F").

Particle Size Measurement

Particle size of emulsion polymer particles in an aqueous polymer dispersion was measured by using a Brookhaven BI-90 or 90Plus Particle Size Analyzer, which employs the technique of photon correlation spectroscopy (light scatter of sample particles). This method involved diluting 2 drops of a polymer dispersion to be tested in 20 mL of 0.01 M NaCl solution, and further diluting the resultant mixture in a sample cuvette to achieve a desired count rate (K) (e.g., K ranging from 250 to 500 counts/sec for diameter in the range of 10-300 nm, and K ranging from 100 to 250 counts/sec for diameter in the range of 300-500 nm). Then the particle size was measured and reported as an average diameter by intensity.

Solid Content of Aqueous Polymer Dispersions

Solids content was measured by weighting 0.7±0.1 g of a sample (wet weight of the sample is denoted as "W1"), putting the sample into an aluminum pan (weight of aluminum pan is denoted as "W2") in an oven at 150° C. for 25 min, and then cooling to room temperature and weighting the aluminum pan with the dried sample with total weight denoted as "W3". "W3-W2" refers to dry or solids weight of the sample. Solids content is calculated as below:

$$(W3-W2)/W1*100\%.$$

Example (Ex) 1 Aqueous Polymer Dispersion

Preparation of monomer emulsion: A monomer emulsion was prepared by mixing BA (636 grams (g)), MMA (305 g), ST (525 g), MAA (60.3 g), RE1000 (30% active, 18 g) and DI water (440 g), and then emulsified with stirring.

Kettle charge: Next, DI water (1,030 g) and RE1000 (30% active, 36.7 g) were charged to a five-liter multi-neck flask fitted with mechanical stirring.

Monomer feed and polymerization: Contents of the flask were heated to 91° C. under a nitrogen atmosphere. To the stirred flask, ammonia (25% active, 2.1 g) in DI water (4 g), the monomer emulsion (95 g) with rinse DI water (43 g), an aqueous solution of APS (2.89 g APS in 17 g DI water) were added to the reactor. The remaining monomer emulsion, another aqueous solution of APS (1.79 g APS in 55 g water), and a solution of ammonia (25% active, 9 g) in water (45 g) were added gradually over 120 min. Flask temperature was maintained at 88° C. Then, DI water (40 g) was used to rinse the emulsion feed line to the flask. Thereafter, a solution of $FeSO_4 \cdot 77H_2O$ (0.02 g) and ethylenediaminetetraacetic acid (EDTA) (0.07 g) in water (10 g) was added to the flask. 1.48 g t-BHP (70% active) in 15 g water, 0.67 g IAA in 15 g water were shot into the flask. Then, aqueous solutions of t-BHP (70% active, 3.36 g) in water (27.2 g) and IAA (1.76 g) in water (30 g) were fed into the flask over 30 min with agitation. The contents of the flask were cooled to room temperature. At last, ammonia (25% active, 10 g) in water (20 g) was added as a neutralizer over 10 min to obtain the aqueous polymer dispersion.

Ex 2

Ex 2 was conducted according to the same procedure as Ex 1, except the monomer emulsion was prepared by mixing BA (636 g), MMA (153 g), ST (678 g), MAA (60.3 g), RE1000 (18 g, 30% active) and DI water (440 g), and then emulsified with stirring.

Ex 3

Ex 3 was conducted according to the same procedure as Ex 1, except the monomer emulsion was prepared by mixing EHA (546 g), MMA (395 g), ST (528 g), MAA (60.3 g), RE1000 (18 g, 30% active) and DI water (440 g), and then emulsified with stirring.

Ex 4

Ex 4 was conducted according to the same procedure as Ex 1, except the monomer emulsion was prepared by mixing BA (636 g), CHMA (305 g), ST (525 g), MAA (60.3 g), RE1000 (30% active, 18 g) and DI water (440 g), and then emulsified with stirring.

Comparative (Comp) Ex 1

Comp Ex 1 was conducted according to the same procedure as Ex 1, except the steps of preparation of monomer emulsion and kettle charge were as follows:

The monomer emulsion was prepared by mixing BA (636 g), MMA (153 g), ST (678 g), MAA (60.3 g), AR-1025 (21 g, 25% active) and DI water (440 g), and then emulsified with stirring. Next, DI water (1,000 g) and AR-1025 (60 g, 25% active) were charged to a five-liter multi-neck flask fitted with mechanical stirring.

Comp Ex 2

Comp Ex 2 was conducted according to the same procedure as Ex 1, except the steps of preparation of monomer emulsion and kettle charge were as follows:

The monomer emulsion was prepared by mixing BA (636 g), MMA (153 g), ST (678 g), MAA (60.3 g), SR-1025 (25% active, 21 g) and DI water (440 g), and then emulsified with stirring. Next, DI water (1,000 g) and SR-1025 (60 g, 25% active) were charged to a five-liter multi-neck flask fitted with mechanical stirring.

Comp Ex 3

Comp Ex 3 was conducted according to the same procedure as Ex 1, except the steps of preparation of monomer emulsion and kettle charge were as follows:

The monomer emulsion was prepared by mixing BA (636 g), MMA (305 g), ST (525 g), MAA (60.3 g), WA-1802 (31% active, 17.42 g) and DI water (440 g), and then emulsified with 30 stirring. Next, DI water (1030 g) and WA-1802 (31% active, 35.5 g) were charged to a five-liter multi-neck flask fitted with mechanical stirring.

Comp Ex 4

Comp Ex 4 was conducted according to the same procedure as Ex 1, except the steps of preparation of monomer emulsion and kettle charge were as follows:

The monomer emulsion was prepared by mixing BA (636 g), MMA (305 g), ST (525 g), MAA (60.3 g), RS-610 (25% active, 21 g) and DI water (440 g), and then emulsified with stirring. Next, DI water (1,030 g) and Fes-32 (32% active, 34.4 g) were charged to a five-liter multi-neck flask fitted with mechanical stirring.

Comp Ex 5

Comp Ex 5 was conducted according to the same procedure as Ex 1, except the monomer emulsion was prepared by mixing BA (636 g), ST (830 g), MAA (60.3 g), RE1000 (30% active, 18 g) and DI water (440 g), and then emulsified with stirring.

Comp Ex 6

Comp Ex 6 was conducted according to the same procedure as Ex 1, except the monomer emulsion was prepared by mixing BA (636 g), MMA (458 g), ST (372 g), MAA (60.3 g), RE1000 (30% active, 18 g) and DI water (440 g), and then emulsified with stirring.

Comp Ex 7

Comp Ex 7 was conducted according to the same procedure as Ex 1, except the monomer emulsion was prepared by mixing BA (636 g), MMA (710 g), ST (220 g), MAA (60.3 g), RE1000 (30% active, 18 g) and DI water (440 g), and then emulsified with stirring.

Comp Ex 8

Comp Ex 8 was conducted according to the same procedure as Ex 1, except the monomer emulsion was prepared by mixing EHA (587 g), ST (653 g), MMA (326 g), MAA (60.3 g), RE1000 (30% active, 18 g) and DI water (440 g), and then emulsified with stirring.

Comp Ex 9

Comp Ex 9 was conducted according to the same procedure as Ex 1, except the steps of preparation of monomer emulsion and kettle charge were as follows:

The monomer emulsion was prepared by mixing EHA (687 g), AN (299 g), ST (457 g), MAA (60.3 g), XN-45S (60% active, 9 g) and DI water (440 g), and then emulsified with stirring. Next, DI water (1,350 g) and XN-45S (60% active, 18.4 g) were charged to a five-liter multi-neck flask fitted with mechanical stirring.

Comp Ex 10

Comp Ex 10 was conducted according to the same procedure as Ex 1, except the steps of preparation of monomer emulsion and kettle charge were as follows:

The monomer emulsion was prepared by mixing EHA (687 g), AN (299 g), ST (457 g), MAA (60.3 g), RE1000 (30% active, 18 g) and DI water (440 g), and then emulsified with stirring. Next, DI water (1,350 g) and RE1000 (30% active, 36.7 g) were charged to a five-liter multi-neck flask fitted with mechanical stirring.

Comp Ex 11

Comp Ex 11 was conducted according to the same procedure as Ex 1, except the monomer emulsion was prepared by mixing BA (731 g), MMA (512 g), ST (219 g), acrylic acid (29.9 g), RE1000 (30% active, 18 g) and DI water (440 g), and then emulsified with stirring.

The monomer composition used in Comp Ex 11 was substantially the same as Example 2 of US2015/0166474A1.

Properties of the obtained aqueous polymer dispersions of Exs 1-4 and Comp Exs 1-11 are given in Table 1.

TABLE 1

Properties of Aqueous Polymer Dispersions

| | pH | Solids content[1] (%) | Particle size[2] (nm) | Viscosity[3] (centipoise) |
|---|---|---|---|---|
| Ex 1 | 8.32 | 45.95 | 122 | 153 |
| Ex 2 | 8.28 | 45.93 | 124 | 144 |
| Ex 3 | 8.13 | 45.99 | 120 | 124 |
| Ex 4 | 8.1 | 44.24 | 111 | 84 |
| Comp Ex 1 | 8.14 | 45.62 | 92 | 444 |
| Comp Ex 2 | 8.18 | 46.03 | 116 | 176 |
| Comp Ex 3 | 8.21 | 44.23 | 103 | 86 |
| Comp Ex 4 | 7.94 | 43.94 | 100 | 100 |
| Comp Ex 5 | 8.20 | 45.60 | 125 | 125 |
| Comp Ex 6 | 8.24 | 45.66 | 118 | 160 |
| Comp Ex 7 | 8.14 | 47.85 | 113 | 686 |
| Comp Ex 8 | 8.04 | 46.04 | 106 | 292 |
| Comp Ex 9 | 7.91 | 41.50 | 120 | 82 |
| Comp Ex 10 | 7.47 | 40.40 | 89 | 297 |
| Comp Ex 11 | 7.42 | 44.62 | 133 | 44 |

[1]Solids content and [2]Particle size were determined according to the test methods described above.

[3]Viscosity was determined by Brookfield viscometer DV-I Primer (60 rpm, spindle #2).

Coating Compositions

The as prepared aqueous polymer dispersions were used as binders for preparing coating compositions, based on formulations given in Table 2. Ingredients for preparing grinds were mixed using a high speed Cowles disperser at 1,200 (rpm) for 30 minutes to form the grinds. Then, the ingredients for letdown were added to the grinds using a conventional lab mixer to obtain the coating compositions. For each coating composition, the dosage of the binder and water used in the letdown stage were adjusted to keep solids weight of the binder as 23.14 g and the total weight of the coating composition as 100 g. The obtained coating compositions were evaluated according to the test methods described above and early water blister resistance properties of the obtained coating films are given in Table 3.

TABLE 2

| Coating Compositions | | |
|---|---|---|
| Material Name | Supplier | gram |
| Grind stage | | |
| Water | | 6.6 |
| Ammonia neutralizer | | 0.2 |
| Dispex A40 dispersant | BASF | 0.3 |
| BYK-181 wetting agent | BYK Additives & Instruments | 0.3 |
| Propylene glycol (PG) as freeze-thaw agent | Sinopharm Chemical Reagent Co., Ltd. | 1 |
| TEGO Airex 902W defoamer | Evonik Industries | 0.2 |
| Bentonite-LT extender | Guangfu Building Material Group | 0.1 |
| Feldspar extender | Guangfu Building Material Group | 10 |
| Ti-Pure R-902 titanium dioxide | The Chemours Company | 19 |
| Talc 800 extender | Guangfu Building Material Group | 3 |
| Letdown stage | | |
| Binder | | |
| Texanol coalescent | Eastman Chemical Company | 2.98 |
| Water | | |
| TEGO Twin 4100 wetting agent | Evonik Industries | 0.1 |
| Total | | 100 |

As shown in Table 3, the binders of Exs 1-4 in which polymer segments derived from the anionic and nonionic monomers had the required Hansen solubility parameters (HSP) (δOD 16.42-16.64, δP: 2.87-3.79, and δH: 3.94-4.57). The coating compositions comprising these binders (Exs 1-4) all provided coating films with excellent early water blister resistance with ratings of 10. In contrast, coating compositions comprising binders prepared in the presence of AR 1025 polymerizable anionic tristyrylphenol surfactant (Comp Ex 1), SR 1025 polymerizable anionic allyl surfactant (Comp Ex 2), or non-reactive surfactants (Comp Exs 3, 4 and 9) all provided undesirably poor early water blister resistance. Moreover, coating compositions comprising binders in which polymer segments derived from anionic monomers and nonionic monomers had one or more Hansen solubility parameter falling outside the required ranges (Comp Exs 5-8 and 10-11) all provided coating films with poor early water blister resistance.

TABLE 3

Properties of Coating Compositions

| Binder in coating compositions | | | | | Properties of coatings |
|---|---|---|---|---|---|
| Binder (Aqueous polymer dispersion) | Surfactant used for preparing binder | Calculated HSP values for polymer segments derived from anionic and nonionic monomers used for preparing binders δD | δP | δH | Early water blister resistance |
| Ex 1 | RE1000 | 16.42 | 3.79 | 4.57 | 10 |
| Ex 2 | RE1000 | 16.64 | 3.34 | 4.10 | 10 |
| Ex 3 | RE1000 | 16.45 | 2.87 | 3.94 | 10 |
| Ex 4 | RE1000 | 16.47 | 3.30 | 4.10 | 10 |
| Comp Ex 1 | AR-1025 | 16.42 | 3.79 | 4.57 | 8F |
| Comp Ex 2 | SR-1025 | 16.42 | 3.79 | 4.57 | 8M |
| Comp Ex 3 | WA-1802 | 16.42 | 3.79 | 4.57 | 8M |
| Comp Ex 4 | Fes-32 + RS-610 | 16.42 | 3.79 | 4.57 | 8M |
| Comp Ex 5 | RE1000 | 16.87 | 2.89 | 3.63 | 6M |
| Comp Ex 6 | RE1000 | 16.19 | 4.24 | 5.04 | 8M |
| Comp Ex 7 | RE1000 | 15.97 | 4.69 | 5.52 | 8M |
| Comp Ex 8 | RE1000 | 16.58 | 2.61 | 3.67 | 8F |
| Comp Ex 9 | XN-45S | 16.31 | 4.68 | 3.86 | 8F |
| Comp Ex 10 | RE1000 | 16.31 | 4.68 | 3.86 | 8F |
| Comp Ex 11 | RE1000 | 15.94 | 4.64 | 5.45 | 8F |

What is claimed is:

1. An emulsion polymer comprising:

(a) structural units of a polymerizable surfactant having the structure of formula (I), (I)

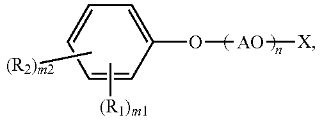

wherein $R_1$ is a phenyl group or

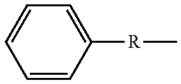

where R is an alkylene group; m1 is 1, 2, 3 or 4; $R_2$ is an alkyl or a substituted alkyl; m2 is 0 or 1; A represents an alkylene group or a substituted alkylene group, having 2 to 4 carbon atoms; n is an integer in the range of from 1 to 30; and X represents $—(CH_2)_a—SO_3M$ or $—(CH_2)_b—COOM$, where a and b are each independently an integer of from 0 to 4, and M is an aminium ion having one ethylenically unsaturated bond;

(b) structural units of an ethylenically unsaturated anionic monomer; and (c) structural units of an ethylenically unsaturated nonionic monomer;

wherein polymer segments that comprise structural units of the ethylenically unsaturated anionic monomer and polymer segments that comprise structural units of the ethylenically unsaturated nonionic monomer together have the following Hansen solubility parameters:

$$16.42 \le \delta D \le 16.64,\ 2.87 \le \delta P \le 3.79, \text{ and } 3.94 \le \delta H \le 4.57.$$

2. The emulsion polymer of claim 1, wherein, in formula (I), $R_1$ is

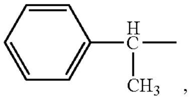

and $m_1$ is 2 or 3.

3. The emulsion polymer of claim 1, wherein, in formula (I), A represents $—CH_2CH_2—$, and X represents $—SO_3M$, where M is

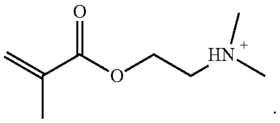

4. The emulsion polymer of claim 1, wherein the ethylenically unsaturated nonionic monomer is selected from the group consisting of styrene, butyl acrylate, 2-ethylhexyl acrylate, methyl methacrylate, cyclohexyl methacrylate, or mixtures thereof.

5. The emulsion polymer of claim 1, wherein the emulsion polymer comprises, by weight based on the weight of the emulsion polymer, from 0.5% to 3% of the polymerizable surfactant.

6. The emulsion polymer of claim 1, comprising, by weight based on the weight of the emulsion polymer, structural units of the polymerizable surfactant having the structure of:

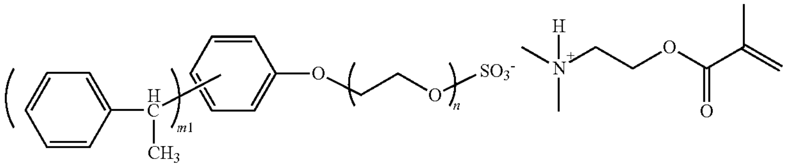

, where m1 is 2 or 3, and n is an integer in the range of from 1 to 30;

structural units of the ethylenically unsaturated anionic monomer;

from 30% to 50% of structural units of styrene;

from 35% to 45% of structural units of butyl acrylate; and structural units of cyclohexyl methacrylate, methyl methacrylate, or mixtures thereof.

7. The emulsion polymer of claim 1, comprising, by weight based on the weight of the emulsion polymer, structural units of the polymerizable surfactant having the structure of

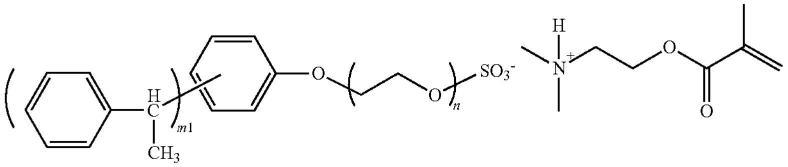

, where m1 is 2 or 3, and n is an integer in the range of from 1 to 30;

structural units of the ethylenically unsaturated anionic monomer;

from 30% to 40% of structural units of styrene;

from 30% to 39.5% of structural units of 2-ethyl hexyl acrylate; and structural units of cyclohexyl methacrylate, methyl methacrylate, or mixtures thereof.

8. A process for preparing the emulsion polymer of claim 1, comprising:

emulsion polymerization of a monomer mixture comprising an ethylenically unsaturated anionic monomer and an ethylenically unsaturated nonionic monomer in the presence of a polymerizable surfactant, wherein the polymerizable surfactant has the structure of formula (I), (I)

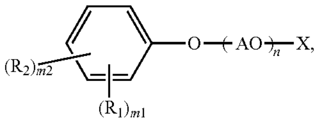

wherein $R_1$ is a phenyl group or

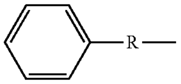

, where R is an alkylene group; m1 is 1, 2, 3 or 4; $R_2$ is an alkyl or a substituted alkyl; m2 is 0 or 1; A represents an alkylene group or a substituted alkylene group, having 2 to 4 carbon atoms; n is an integer in the range of from 1 to 30; and X represents $-(CH_2)_a-SO_3M$ or $-(CH_2)_b-COOM$, where a and b are each independently an integer of from 0 to 4, and M is an aminium ion having one ethylenically unsaturated bond;

wherein polymer segments that comprise structural units of the ethylenically unsaturated anionic monomer and polymer segments that comprise structural units of the ethylenically unsaturated nonionic monomer together have the following Hansen solubility parameters:

$$16.42 \le \delta D \le 16.64,\ 2.87 \le \delta P \le 3.79,\ \text{and}\ 3.94 \le \delta H \le 4.57.$$

9. An aqueous coating composition comprising the emulsion polymer of claim 1.

* * * * *